United States Patent Office 2,903,486
Patented Sept. 8, 1959

2,903,486

ALKYLPHENOXYPOLYETHOXYALKANOLS

George L. Brown, Moorestown, N.J., and Earl W. Lane, Philadelphia, Pa., assignors to Rohm & Haas Company, Philadelphia, Pa., a corporation of Delaware No Drawing. Application November 29, 1956
Serial No. 624,982

9 Claims. (Cl. 260—613)

This invention deals with specific alkylphenoxypolyethoxyalkanols as new compositions of matter. It further concerns a method for the preparation of these compositions.

The compounds of this invention may be represented by the formula

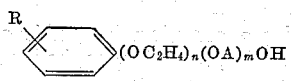

in which R is an alkyl group of eight to nine carbon atoms, A is an alkylene chain of three to four carbon atoms, $n$ is an integer of seven to sixteen, and $m$ is an integer of one to ten, to be more fully explained hereinafter.

R may represent an octyl or nonyl group, exhibiting any of the known spatial configurations such as normal, iso, tertiary, and the like. R may occupy any possible ring location, with the para position with respect to the ether chains preferred.

A represents a propylene or butylene group in any of their known isomeric configurations.

The symbol $n$ represents an integer of seven to sixteen and $m$ stands for an integer of one to ten. The number of ethylene oxide units is determined by the value of $n$ and the number of propylene or butylene oxide units is determined by the volume of $m$. Within the definitions of $m$ and $n$ the following relationships must be observed. The value of $n$ must always be at least 1.2 and preferably about two to three times the value of $m$, when A represents a propylene group. When A represents a butylene group, $n$ must be at least about four, and preferably more, times the value of $m$. Therefore, it can be seen that one butylene group has the same effect as about two to three propylene groups in the present compounds. It is contemplated that both propylene and butylene groups may be present in the same compound in addition to the ethylene groups particularly when $n$ has its higher values. The values of $m$ and $n$ in the instant compounds are to be construed in the light of the above discussion.

It is critical in the present compounds that the oxyethylene groups be positioned proximate the benzene ring and that the oxypropylene or oxybutylene groups or both, as the case may be, be terminally located at the opposite end of the chain from the benzene ring. Only by strict adherence to this specific structure can the desired results be obtained. The products of this invention are colorless to pale yellow liquids that exhibit good detergency, for instance on glass, plastic, and metal, high cloud points, very slight or no foam, low solidification temperatures, stability in built formulations, and good wetting characteristics. Surprisingly, the present compounds possess all of the above desirable properties to a highly advantageous degree, which makes them valuable for many important applications, particularly commercial and residential automatic dishwashing and textile cleansing, unavailable to compounds that have some structural similarities.

It is known in the art that various alkylene oxides can be added to compounds having reactive hydrogen atoms to form compounds that are surface active. The known compounds generally suffer from one or more deficiencies with regard to the above-enumerated properties, the absence of any one of which can act as a bar to many practical applications. For instance, many otherwise acceptable detergents exhibit high foam which bars their use in many applications; others are unstable in built formulations and become discolored in an unsightly way frequently with concurrent diminution of detersive properties; others tend to become very viscous even to the point of solidification even in the range of normal room temperatures which bars their use in automatic dispensing units; others have unsatisfactory cloud points under normal storage conditions. The unique compounds of this invention suffer no such limitations and, hence, have a wide range of valuable applications not available to the known compounds.

The unusual characteristics and concurrent advantageous uses of the present compounds are apparently based on the critical ratios between specific oxyalkylene groups present and the molecular positions of the inwardly located oxyethylene groups and the terminally located oxypropylene or oxybutylene groups. When oxypropylene and oxybutylene groups are both present the oxyethylene groups must be attached to the benzene ring and the oxypropylene and oxybutylene groups attached to the oxyethylene groups in any desired order but preferably with the oxybutylene groups in the ultimate terminal position. The relative positions of the oxyethylene and other oxyalkylene groups are of critical significance for reasons not clearly understood but believed to be based on the effect they have on the hydrophobic-hydrophilic orientation of the entire compound. This is a surprising result in the light of the teaching of the art that these oxyalkylene groups are equivalent and rather indiscriminately interchangeable and that as here taught the reversal of positions of the oxyethylene and other oxyalkylene groups within the molecule, i.e. the oxypropylene or oxybutylene groups, leads to greatly diverse characteristics, to be more fully described hereinafter.

The foam characteristics of the present compounds were evaluated by employing 1.0% by weight of a selected instant compound in a constant volume of constant temperature water (135° F.) in a standard commercial dishwasher, observing the speed of the rotor spray arm, and comparing the speed of the rotor spray arm when the same volume of same temperature of water was used as a blank. The speed of the rotor spray arm in revolutions per minute for water alone was 100. For a detergent to be commercially acceptable it must give a value of about 75 and preferably 80 or above. The present compounds consistently yield values ranging between 80 and 100. On the other hand, compounds having the same empirical formula as the present compounds but having a configuration

in which the oxyethylene groups are terminally positioned rather than being medianly located as in the present compounds, gave values below 30 down to the point of stalling the motor, with concurrent serious diminution of cleansing powers reduced to the range of unacceptability.

Dishwashing detersive characteristics were determined by the Fineman dynamic hard surface detergency test in which the compound under test was evaluated against glass, steel, and plastic substrates. The present compounds gave excellent results on all three substrates both as to cleansing efficiency and prevention of redeposition of soil. These compounds are also effective textile detergents, particularly for removal of oily carbon from cotton and wool.

It is important in most practical applications that a detergent have a cloud point appreciably above the normal temperature at which it is to be stored. This is even more significant where automatic dispensing units are contemplated. If the cloud point of a detergent is too low, undesired stratification occurs from its aqueous solutions so that, especially on prolonged storage, the concentration of any given portion of the stratified aqueous detergent system is unpredictable and, therefore, highly undesirable. Under such circumstances it is highly problematical what detersive effects will be realized. As a general rule it is advantageous for a detergent to have a cloud point at least above normal room temperatures. The instant compounds have cloud points that range from above 30° C. to well above 60° C. as determined in 1% distilled aqueous systems by a standard method.

The compounds of this invention have very low solidification temperatures frequently ranging from about 0° to 5° C. and lower. This means that the present compounds may be stored in containers in cool temperature and still be pourable and, therefore, readily transferable and usable. Many compounds having the formula

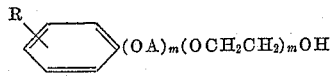

are at least semi-solids at room temperatures and, therefore, must be stored with care or reheated in order to restore pourability.

The instant compounds are excellent textile wetting agents as determined by the standard Draves test wherein there is determined the amount of wetting agent needed to wet a standard cotton skein in 25 seconds. The amount of a compound needed to accomplish this wetting is a measure of its efficiency and acceptability. Acceptable textile wetting agents need be present in amounts by weight usually no higher than about 0.060%. The compounds of this invention give values in the range of 0.040 to 0.060%, indicating excellent textile wetting characteristics. Compounds having the formula

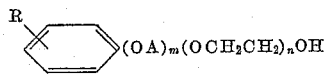

on the other hand consistently give values well above the acceptable figure, frequently giving values appreciably above .070%.

If desired, the compounds of this invention may be built into desirable formulations by employing borates, carbonates, silicates, phosphates, and the like, in known ways. These formulations are effective and stable.

The compounds of this invention are prepared by reacting an alkylphenol with ethylene oxide in the temperature range of 130° to 210° C., preferably 150° to 185° C. and in the presence of a strong basic catalyst such as sodium, sodium hydroxide, potassium hydroxide, sodium methoxide, and the like. Pressures from atmospheric to about 30 pounds per square inch gauge may be advantageously employed. Following the ethylene oxide addition there is added in a similar way and under similar reaction conditions proplyene oxide or butylene oxide or both. If both are to be used they may be added successively or concurrently, that is separately or mixed, as desired. The product is isolated by neutralizing the catalyst, steam stripping until residual oxide odors disappear and then by stripping off water preferably under reduced pressure. If desired, the ethylene oxide adduct may be purified before the propylene or butylene oxide is added, but such is not necessary.

The compounds of this invention and the method of their preparation may be more fully understood from the following illustrative examples in which parts by weight are used throughout.

EXAMPLE 1

There are added to a reaction vessel 103 parts of octylphenol and five parts of sodium. The system is flushed out with nitrogen and the temperature of the reaction mixture raised to 175° C. Ethylene oxide is slowly introduced over a period of two hours at a temperature of 182° to 210° C. during which time 213.4 parts of ethylene oxide reacted. The adduct is washed with water, neutralized with aqueous 10% hydrochloric acid, and then made basic with sodium hydroxide. The adduct is then taken up in isopropanol, washed with aqueous 10% sodium chloride, stripped to dryness and filtered. To the filtrate heated to 105° C. in a reaction vessel there is added 2.1 parts of sodium methoxide. Propylene oxide is added dropwise over a period of five hours until three equivalents are reacted. The temperature of the reaction medium is maintained at 140° to 179° C. during the propylene oxide addition. The mixture is cooled and neutralized with concentrated sulfuric acid. The product is steam stripped for fifty minutes and then heated at 140° C. under water vacuum. The product is filtered and identified as the compound having the formula

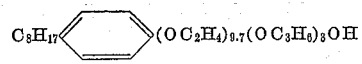

Similarly, using a potassium hydroxide catalyst, there are prepared the compounds having the formula

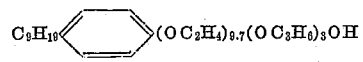

and

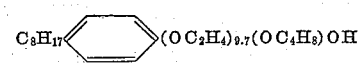

By employing the procedure set forth in Example 1 the compounds shown in Table A are prepared.

Table A

| Compound | Cloud Point | Dishwasher Foam Rating |
|---|---|---|
| $C_8H_{17}C_6H_4(OC_2H_4)_{9.7}(OC_3H_6)_4OH$ | 41 | 100 |
| $C_8H_{17}C_6H_4(OC_2H_4)_{9.7}(OC_3H_6)_{3.5}OH$ | 46 | 90 |
| $C_9H_{19}C_6H_4(OC_2H_4)_{7.5}(OC_3H_6)_{1.1}OH$ | 36 | 76 |
| $C_8H_{17}C_6H_4(OC_2H_4)_{7.0}(OC_3H_6)_2OH$ | 34 | 86 |
| $C_8H_{17}C_6H_4(OC_2H_4)_{7.5}(OC_3H_6)_{2.9}OH$ | 33 | 94 |
| $C_8H_{17}C_6H_4(OC_2H_4)_{7.5}(OC_3H_6)_{4.0}OH$ | 30 | 100 |
| $C_8H_{17}C_6H_4(OC_2H_4)_{9.7}(OC_3H_6)_{2.0}OH$ | 51 | 76 |
| $C_8H_{17}C_6H_4(OC_2H_4)_{9.7}(OC_3H_6)_{2.9}OH$ | 47 | 86 |
| $C_8H_{17}C_6H_4(OC_2H_4)_{9.7}(OC_3H_6)_{4.2}OH$ | 41 | 100 |
| $C_9H_{19}C_6H_4(OC_2H_4)_{9.7}(OC_3H_6)_{4.7}OH$ | 40 | 100 |
| $C_8H_{17}C_6H_4(OC_2H_4)_{9.7}(OC_3H_6)_{5.2}OH$ | 38 | 92 |
| $C_8H_{17}C_6H_4(OC_2H_4)_{9.7}(OC_3H_6)_7OH$ | 33 | 100 |
| $C_8H_{17}C_6H_4(OC_2H_4)_{12.5}(OC_3H_6)_{2.0}OH$ | 57 | 78 |
| $C_8H_{17}C_6H_4(OC_2H_4)_{12.5}(OC_3H_6)_{5.1}OH$ | 48 | 80 |
| $C_9H_{19}C_6H_4(OC_2H_4)_{12.5}(OC_3H_6)_{6.0}OH$ | 44 | 88 |
| $C_8H_{17}C_6H_4(OC_2H_4)_{12.5}(OC_3H_6)_{6.0}OH$ | 42 | 92 |
| $C_8H_{17}C_6H_4(OC_2H_4)_{12.5}(OC_3H_6)_{9.5}OH$ | 34 | 98 |
| $C_9H_{19}C_6H_4(OC_2H_4)_{16}(OC_3H_6)_{7.0}OH$ | 52 | 82 |
| $C_8H_{17}C_6H_4(OC_2H_4)_{16}(OC_3H_6)_{7.8}OH$ | 49 | 78 |
| $C_8H_{17}C_6H_4(OC_2H_4)_{16}(OC_3H_6)_{9.4}OH$ | 46 | 90 |
| $C_8H_{17}C_6H_4(OC_2H_4)_{16}(OC_3H_6)_{10}OH$ | 45 | 90 |
| $C_8H_{17}C_6H_4(OC_2H_4)_{16}(OC_3H_6)_{14.1}OH$ | 37 | 95 |
| $C_8H_{17}C_6H_4(OC_2H_4)_{12.3}(OC_3H_6)_1(OC_4H_8)_1OH$ | 54 | 84 |
| $C_8H_{17}C_6H_4(OC_2H_4)_{12.3}(OC_3H_6)_3(OC_4H_8)_1OH$ | 46 | 98 |
| $C_8H_{17}C_6H_4(OC_2H_4)_{12.3}(OC_3H_6)_5(OC_4H_8)_5OH$ | 38 | 96 |
| $C_8H_{17}C_6H_4(OC_2H_4)_{16}(OC_3H_6)_3(OC_4H_8)_1OH$ | 46 | 92 |
| $C_8H_{17}C_6H_4(OC_2H_4)_{9.7}(OC_4H_8)_{1.0}OH$ | 40 | 86 |
| $C_8H_{17}C_6H_4(OC_2H_4)_{12.5}(OC_4H_8)_{2.6}OH$ | 37 | 98 |

EXAMPLE 2

There are added to a reaction vessel 412 parts of octylphenol and two parts of sodium hydroxide. The system is swept with nitrogen and the reaction mixture is heated to 139° C. at which point ethylene oxide is introduced. A total of 817.1 parts of ethylene oxide is added over a period of five and one-half hours while the temperature is held at 170° to 185° C. The compound

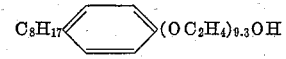

is collected and 368.7 parts of it is introduced into a reaction vessel. The temperature of the system is raised to 133° C. and propylene oxide slowly introduced. The temperature is slowly raised to 180° C. and held at that level for the remainder of the reaction. A total of 121.5 parts of propylene oxide is added over a period of one and one-half hours. The reaction mixture is neutralized with aqueous 20% sulfuric acid and steam stripped. Water is removed by heating the mixture up to 144° C. under water vacuum. The mixture is filtered and the product is collected as the filtrate. The product corresponds to the compound having the formula

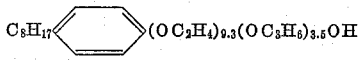

In a similar way there are prepared the compounds of this invention having the formulas $$C_8H_{17}C_6H_4(OC_2H_4)_{16}(OC_3H_6)_{2.8}OH$$
$$C_8H_{17}C_6H_4(OC_2H_4)_{16}(OC_3H_6)_{4.8}OH$$
$$C_9H_{19}C_6H_4(OC_2H_4)_{9.7}(OC_4H_8)_{1.1}OH$$
$$C_9H_{19}C_6H_4(OC_2H_4)_{16}(OC_4H_8)_{2.5}OH$$
$$C_8H_{17}C_6H_4(OC_2H_4)_7(OC_3H_6)(OC_4H_8)OH$$
$$C_9H_{19}C_6H_4(OC_2H_4)_7(OC_3H_6)(OC_4H_8)OH$$
$$C_8H_{17}C_6H_4(OC_2H_4)_{9.7}(OC_3H_6)_2(OC_4H_8)OH$$
$$C_8H_{17}C_6H_4(OC_2H_4)_{12.5}(OC_3H_6)_{5.1}(OC_4H_8)_2OH$$
$$C_8H_{17}C_6H_4(OC_2H_4)_{16}(OC_3H_6)_{2.8}(OC_4H_8)_3OH$$
$$C_9H_{19}C_6H_4(OC_2H_4)_{16}(OC_3H_6)_{2.8}(OC_4H_8)_3OH$$
$$C_8H_{17}C_6H_4(OC_2H_4)_{16}(OC_3H_6)_{2.2}(OC_4H_8)_{2.2}OH$$

and $$C_8H_{17}C_6H_4(OC_2H_4)_{16}(OC_3H_6)_{7.0}(OC_4H_8)_{1.1}OH$$

The compounds of this invention as illustrated in Examples 1 and 2 and Table A exhibit the surprisingly advantageous concurrence of good detergency, particularly with regard to glass, plastic, metal, cotton, and wool, high cloud points, slight or no foam, low solidification temperatures, stability in built formulations, and good wetting characteristics in a way heretofore unknown.

We claim:

1. As a new composition of matter, the compound having the formula

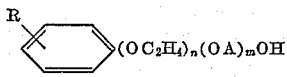

in which R is an alkyl group of eight to nine carbon atoms, A is an alkylene chain of three to four carbon atoms, $n$ is an integer of seven to sixteen and $m$ is an integer of one to ten, such that when A contains 3 carbon atoms $n$ is at least 1.2 times the value of $m$, when A contains 4 carbon atoms $n$ is at least 4 times the value of $m$, and when A represents a 3 and 4 carbon alkylene chain said 1.2 and 4 ratios of $n$ to $m$ apply.

2. As a new composition of matter, the compound having the formula

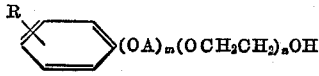

in which R is an alkyl group of eight to nine carbon atoms, $n$ is an integer of seven to sixteen and $m$ is an integer of one to ten, such that $n$ has a value of at least 1.2 times that of $m$.

3. As a new composition of matter,

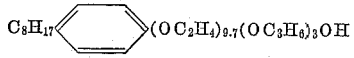

in which said 9.7 subscript represents an average number.

4. As a new composition of matter,

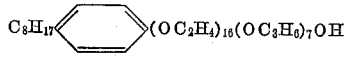

5. As a new composition of matter,

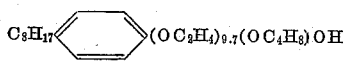

in which said 9.7 subscript represents an average number.

6. As a new composition of matter,

in which said 12.5 subscript represents an average number.

7. As a new composition of matter,

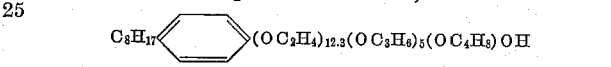

in which said 12.3 subscript represents an average number.

8. As a new composition of matter, the compound having the formula

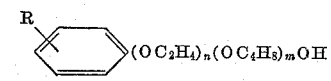

in which R is an alkyl group of eight to nine carbon atoms, $n$ is an integer of seven to sixteen, and $m$ is an integer of one to four, in which $n$ has a value of at least four times that of $m$.

9. As a new composition of matter, the compound having the formula

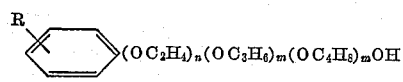

in which R is an alkyl group of eight to nine carbon atoms, $n$ is an integer of seven to sixteen, and $m$ is an integer whose total is two to ten, such that there is always present at least 1.2 times as many oxyethylene groups as oxypropylene groups and at least four times as many oxyethylene groups as oxybutylene groups.

References Cited in the file of this patent
UNITED STATES PATENTS

| | | |
|---|---|---|
| 2,549,434 | De Groote et al. | Apr. 17, 1951 |
| 2,558,512 | De Groote et al. | June 26, 1951 |

UNITED STATES PATENT OFFICE
Certificate of Correction

Patent No. 2,903,486 September 8, 1959

George L. Brown et al.

It is hereby certified that error appears in the printed specification of the above numbered patent requiring correction and that the said Letters Patent should read as corrected below.

Column 5, lines 55 to 58, claim 2, the formula should appear as shown below instead of as in the patent—

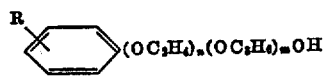

Signed and sealed this 1st day of March 1960.

[SEAL]

Attest:
KARL H. AXLINE,
*Attesting Officer.*

ROBERT C. WATSON,
*Commissioner of Patents.*